(12) United States Patent
Ma et al.

(10) Patent No.: US 7,499,022 B2
(45) Date of Patent: *Mar. 3, 2009

(54) USER INPUT DEVICE WITH VERTICAL GRIP AND SCROLL WHEEL

(75) Inventors: Jeff Ma, Redwood City, CA (US); Ain McKendrick, Menlo Park, CA (US); Robert Yuan, Belmont, CA (US)

(73) Assignee: FastMoto, LLC, Redwood City, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 10/981,984

(22) Filed: Nov. 5, 2004

(65) Prior Publication Data

US 2005/0099389 A1      May 12, 2005

Related U.S. Application Data

(60) Provisional application No. 60/517,748, filed on Nov. 6, 2003.

(51) Int. Cl.
   *G09G 5/00*   (2006.01)
(52) U.S. Cl. ...................... 345/156; 345/161
(58) Field of Classification Search .......... 345/156–169
    See application file for complete search history.

(56) References Cited

U.S. PATENT DOCUMENTS

| | | |
|---|---|---|
| 5,355,147 A | 10/1994 | Lear |
| D367,047 S | 2/1996 | Hood |
| D367,272 S | 2/1996 | Hood |
| 5,576,733 A | 11/1996 | Lo |
| D381,970 S | 8/1997 | Gasca |
| D385,539 S | 10/1997 | Taylor |
| D405,073 S | 2/1999 | Mayer |
| 6,262,715 B1 | 7/2001 | Sawyer |
| 6,577,298 B2 | 6/2003 | Krog |
| D477,602 S | 7/2003 | Aliso |
| 2002/0171625 A1* | 11/2002 | Rothchild .................... 345/156 |
| 2002/0186204 A1* | 12/2002 | Kim ........................... 345/158 |
| 2003/0052862 A1 | 3/2003 | Larkin |
| 2005/0219214 A1* | 10/2005 | Marsac ....................... 345/163 |

* cited by examiner

*Primary Examiner*—Vijay Shankar
(74) *Attorney, Agent, or Firm*—Townsend and Townsend and Crew LLP

(57) ABSTRACT

A device for providing user input to a computer includes a base member with a tracking sensor for detecting motion of the base member and a vertical grip member that extends upward from the base member. A scroll wheel is rotatably mounted in the grip member and oriented so as to be rotatable by a substantially arc-like movement of a thumb of a hand holding the grip member.

16 Claims, 8 Drawing Sheets

USER INPUT DEVICE WITH VERTICAL GRIP AND SCROLL WHEEL

CROSS-REFERENCES TO RELATED APPLICATIONS

This application claims the benefit of U.S. Provisional Application No. 60/517,748, filed Nov. 6, 2003, entitled "Pistol Shaped Mouse and Game Controller," which disclosure is incorporated herein by reference for all purposes.

The present disclosure is related to the following four commonly-assigned co-pending U.S. patent applications:

Application Ser. No. 10/981,991, filed of even date herewith, entitled "User Input Device with Vertical Grip and Tracking SensorOffset";

Application Ser. No. 10/982,312, filed of even date herewith, entitled "User Input Device with Vertical Grip and Single Throw Trigger";

Application Ser. No. 10/982,558, filed of even date herewith, entitled "User Input Device with Pistol Grip and Counterweight"; and Application Ser. No. 10/982,553, filed of even date herewith, entitled "User Input Device with Control Group in Trigger Configuration."

The respective disclosures of these applications are incorporated herein by reference for all purposes.

BACKGROUND OF THE INVENTION

The present invention relates in general to user input devices for controlling computers, and in particular to a user input device with a vertical grip and a scroll wheel.

Among the most popular types of computer games are games known as first-person shooters. Such games vary substantially in details, but they all provide a display that depicts a scene from the perspective of a gun-wielding character. The user maneuvers the character through the scene and scores points by shooting enemies of various sorts. Such games are often played on a conventional computer, and the user controls the character using the computer keyboard and mouse. For instance, pressing the left mouse button fires a shot, moving the mouse aims the gun, and pressing designated keys on the keyboard moves the character around in the scene.

Computer mice have numerous limitations when used as game controllers. For example, the horizontal hand position required when operating a mouse can create stress on the wrist, leading to discomfort and possible repetitive stress injury. In addition, moving the mouse generally involves motion of the entire arm, making it difficult to precisely control the motion. Further, mice are usually equipped with a scroll wheel positioned between the left and right mouse buttons, and many games support using the scroll wheel for user input. The scroll wheel is typically operated by a curling or uncurling finger motion that can also increase stress on the hand. In addition, using a mouse does not replicate the feel of using a gun, which creates distance between the user's perception and the virtual world of the game.

It would therefore be desirable to provide an improved game control device that provides the user an improved gaming experience.

BRIEF SUMMARY OF THE INVENTION

Embodiments of the present invention provide computer input devices (e.g., computer mice) that may be shaped like pistols or other guns. In accordance with one embodiment, a computer input device has a vertical grip member and a scroll wheel that is rotatably mounted in the grip member and oriented so as to be rotatable by a substantially arc-like movement of the thumb of a user's hand holding the grip member.

According to one aspect of the present invention, a device for providing user input to a computer includes a base member, a tracking sensor, a grip member, a scroll wheel, a first scroll wheel sensor and a signaling circuit. The base member is adapted to rest on a support surface. The tracking sensor is mounted in the base member and is configured to generate a position input signal in response to a motion of the base member. The grip member, which is adapted to be held by a substantially vertically oriented hand of a user, is fixedly coupled to the base member and extends upward therefrom. The scroll wheel is rotatably mounted in the grip member such that a first peripheral portion of the scroll wheel extends through a first side surface of the grip member, and an axis of rotation of the scroll wheel is oriented such that the scroll wheel is rotatable by a substantially arc-like movement of a thumb of a hand holding the grip member across the first peripheral portion. The first scroll wheel sensor is coupled to detect a rotational movement of the scroll wheel and configured to generate a scroll input signal in response to the rotational movement of the scroll wheel. The signaling circuit is configured to transmit the position input signal and the scroll input signal to a computer.

In some embodiments, the base member may have a substantially flat bottom surface portion adapted for sliding along the support surface, the grip member may have a major axis extending upward at an angle of at least about 45 degrees relative to the substantially flat bottom surface portion, and the scroll wheel may have a rotational axis that forms an angle of between about 15 degrees and about 75 degrees with the major axis of the grip member.

In some embodiments, a second peripheral portion of the scroll wheel substantially opposite the first peripheral portion may extend through a second side surface of the grip member, thereby enabling ambidextrous access to the scroll wheel. The scroll wheel may also be mounted in the grip member such that either of the first and second peripheral portions is inwardly depressible toward a center vertical plane of the grip member, and a second scroll wheel sensor may be coupled to detect depression of either the first or second peripheral portion and configured to generate a scroll press signal in response to the detected depression.

In some embodiments, one or more button controls may be provided, with each button control being disposed on the grip member so as to be operable by a different finger of a hand holding the grip member. A respective actuation sensor may be coupled to detect operation of each button control and configured to generate a respective button input signal in response to the operation of the button control. A first one of the button controls may have a trigger shape and may be positioned so as to be operable by a first finger of a hand holding the grip member, while a second one of the button controls may be positioned below the trigger so as to be operable by a second finger of the hand holding the grip member.

The following detailed description together with the accompanying drawings will provide a better understanding of the nature and advantages of the present invention.

DETAILED DESCRIPTION OF THE INVENTION

Overview

Embodiments of the present invention provide computer input devices (e.g., computer mice) that may be shaped like pistols or other guns. In accordance with one embodiment, a computer input device has a vertical grip member and a scroll wheel that is rotatably mounted in the grip member and oriented so as to be rotatable by a substantially arc-like movement of the thumb of a user's hand holding the grip member.

Figure 1:
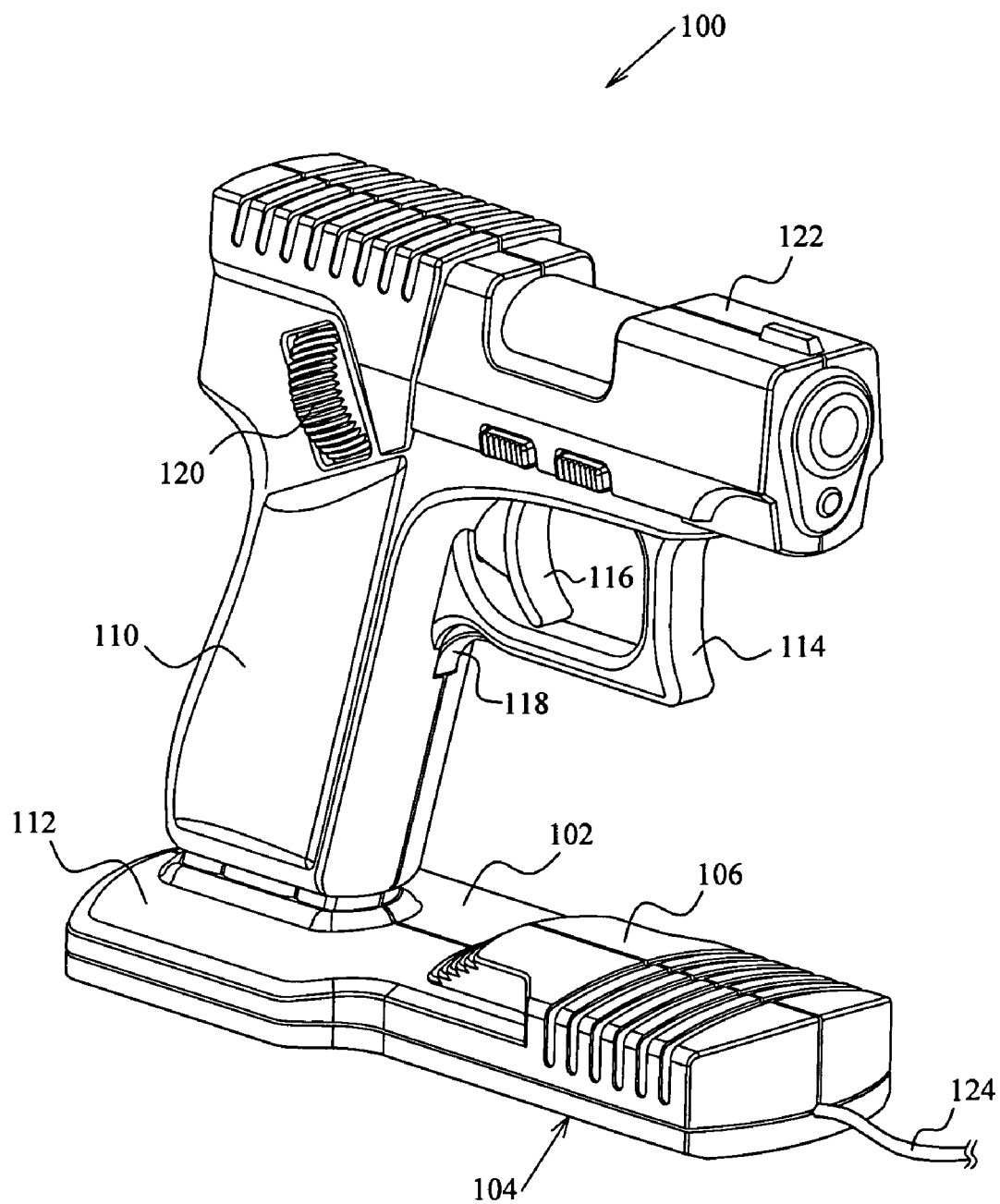
FIG. 1 is a perspective view of a computer mouse according to an embodiment of the present invention.

FIG. 1 is a perspective view of a computer mouse 100 according to an embodiment of the present invention. Computer mouse 100 includes a base member 102 that has a bottom surface 104 adapted for sliding across a surface. For example, bottom surface 104 may be substantially flat, and a low-friction material (such as Teflon pads) may be applied to portions (or all) of bottom surface 104. Base member 102 houses, in forward region 106, a tracking sensor (not shown in FIG. 1), such as an optical sensor, that detects motion of mouse 100 across a surface.

A grip member 110 is fixedly connected to a rearward section 112 of base member 102 and extends generally upward from base member 102. Grip member 110 is advantageously sized and shaped so that it can be held in a user's hand in a manner similar to holding a pistol grip. In this embodiment, grip member 110 includes a forward-extending trigger guard 114 designed to accommodate a user's index finger. A primary trigger 116 is positioned on the forward surface of grip member 110 inside the ring formed by trigger guard 114 and mounted in such a way that it can be depressed by the user's index finger while the user is holding grip member 110. A secondary trigger button 118 is positioned on an under surface of trigger guard 114 near where trigger guard 114 joins grip member 110. Secondary trigger button 118 is mounted in such a way that can be depressed by the user's second finger while the user is holding grip member 110. A scroll wheel 120 is rotatably mounted on the side of grip member 110 above the location of triggers 116, 118 and is disposed so as to be rotatable by the user's thumb while the user is holding grip member 110.

A barrel member 122 extends forward from the upper portion of grip member 110, providing a surface for attaching trigger guard 114 and giving computer mouse 100 a generally pistol-like appearance.

An interface cable 124, which may be, e.g., a conventional Universal Serial Bus (USB) cable, is provided to transmit mouse input signals (also referred to herein as control signals) from computer mouse 100 to a computer. The mouse input signals, which may be generally conventional in nature, advantageously include position and/or motion signals from the tracking sensor housed in forward section 106 of base member 102, as well as button or scrolling signals generated in response to user operation of triggers 116, 118 and scroll wheel 120. In one embodiment, operation of primary trigger 116 generates conventional "Left Button Up/Down," or "Button1 Up/Down," signals; operation of secondary trigger 118 generates conventional "Right Button Up/Down," or "Button2 Up/Down," signals; and operation of scroll wheel 120 generates conventional scroll wheel signals (e.g., "Scroll Down," "Scroll Up," "Scroll Button Press," "Scroll Button Release").

In one embodiment, base member 102, grip member 110 and barrel member 120 are formed of injection-molded plastic. Left-side and right-side sections that incorporate portions of base member 102, grip member 110 and/or barrel member 120 may be molded as unitary work pieces and, after installation of electronic and electromechanical components, may be fastened together e.g., using snap fasteners, bolts, rivets, screws, interlocking tabs and slots, and so on. In one embodiment, the sides of grip member 110 may be padded with a softer material for increased user comfort and/or an esthetically pleasing appearance. Triggers 116, 118 may be made of plastic or other material (e.g., metal) as desired. Scroll wheel 120 may also be made of any material, including plastic; in one embodiment, the outer periphery of scroll wheel 120 is made of a gel-like plastic with a patterned (e.g., ribbed) surface for increased comfort and traction against the user's thumb. It will be appreciated that particular material compositions or assembly techniques are not critical to the present invention; conventional materials and manufacturing processes may be used.

Grip Position and Orientation

Figure 2A:
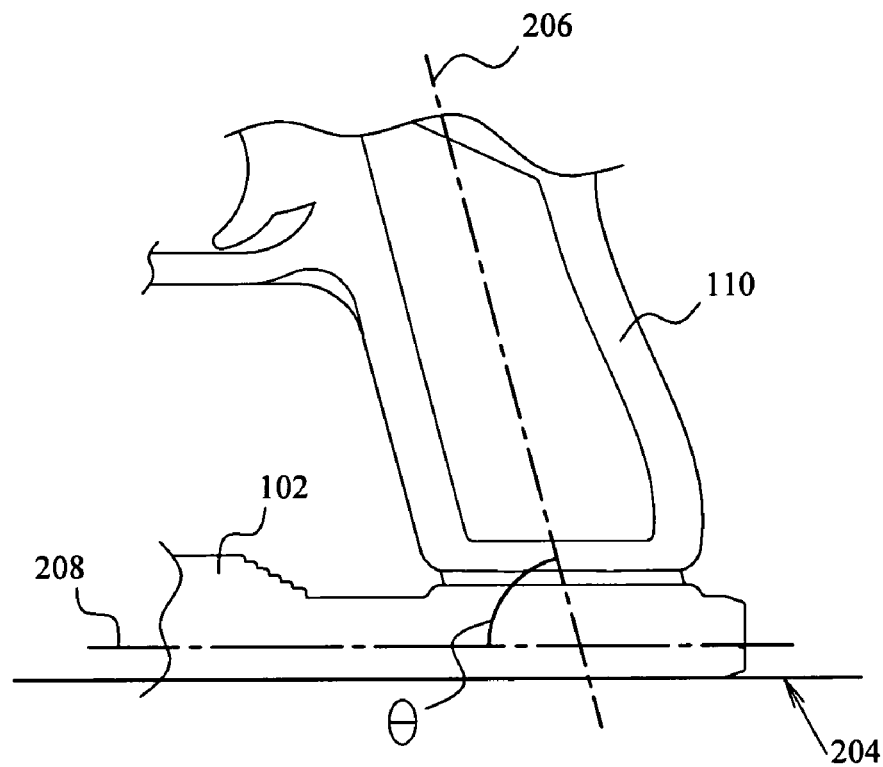
FIGS. 2A-2B are, respectively, a simplified side view and a simplified front view illustrating an orientation of a grip member of a computer mouse according to an embodiment of the present invention.

The orientation of grip member 110 relative to base member 102 advantageously allows a user's hand to be in an ergonomically favorable vertical position while operating computer mouse 100. FIG. 2A is a simplified side view showing base member 102 resting on a surface 204, such as a table top. Grip member 110 has a major axis 206 that extends upward from a "base axis" 208 parallel to surface 204 at an angle $\theta$. In some embodiments, angle $\theta$ is at least about 45° and may advantageously be between about 60° and 90°.

Figure 2B:
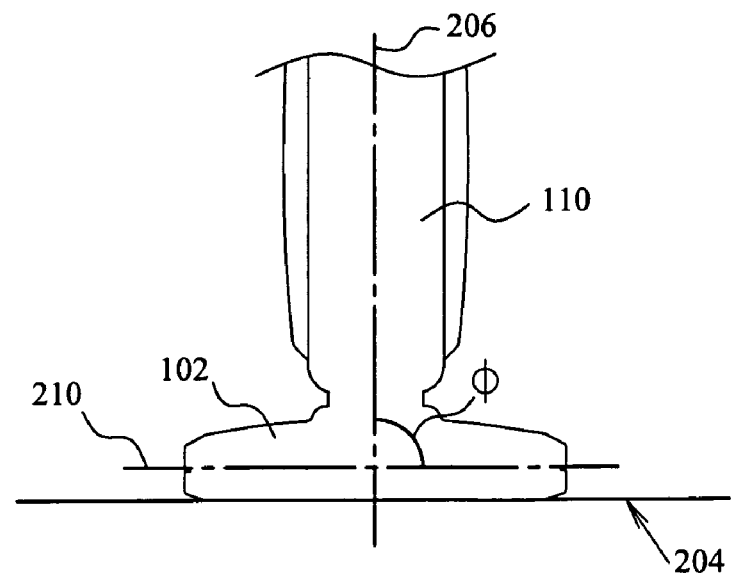

FIG. 2B is a simplified front view showing that major axis 206 of grip member 110 is oriented at an angle $\phi$ with respect to a transverse axis 210 parallel to surface 204. In one embodiment, angle $\phi$ is approximately 90°; in other embodiments, angle $\phi$ may be somewhat smaller so that grip member 110 has an inward cant, or somewhat larger so that grip member 110 has an outward cant. Thus, major axis 206 of grip member 110 is advantageously oriented such that the user's hand is approximately vertical (i.e., the user's palm is approximately in a vertical plane) when the user holds grip 110 with mouse 100 resting on a horizontal surface 204.

Figure 3:
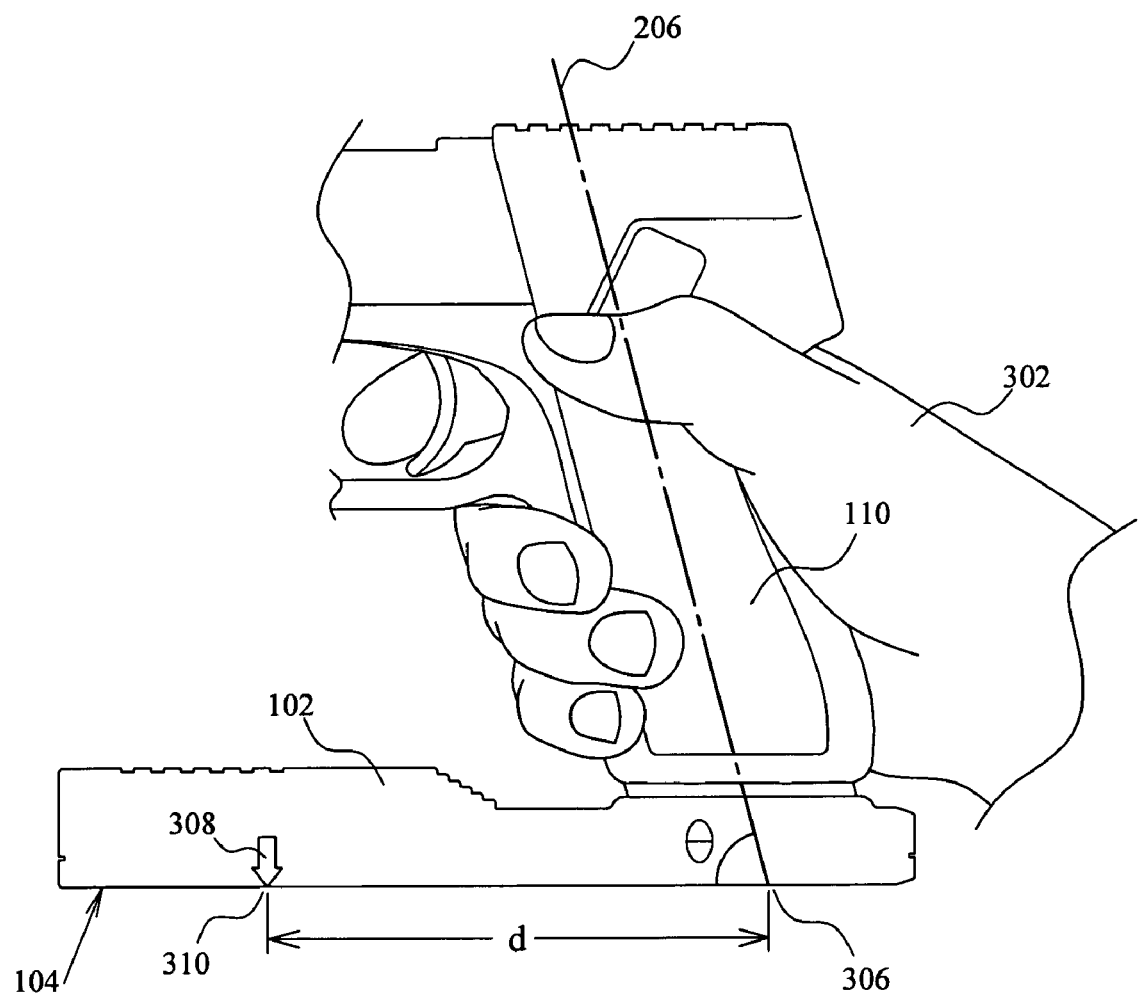
FIG. 3 is a simplified side view illustrating an offset between a grip member and a tracking position sensor in a computer mouse according to an embodiment of the present invention.

In preferred embodiments, further ergonomic advantages may be provided by offsetting the location of the tracking sensor relative to grip member 110. FIG. 3 is a simplified side view illustrating this offset. FIG. 3 shows grip member 110 being held in a user's hand 302 (shown in outline). Major axis 206 of grip member 110 intersects bottom surface 104 of base member 102 at a "grip axis location" 306. A tracking sensor 308 (shown schematically as an arrow) is mounted so as to detect motion at a "sensor location" 310 at or near bottom surface 104 of base member 102. Sensor location 310 is offset in a forward direction from grip axis location 306 by an offset distance d that is advantageously greater than zero. In one embodiment, the offset distance d is about 8 cm; it is to be understood that distance d may be varied as desired and may be, e.g., anywhere from 0-20 cm or another distance. Use of a nonzero offset distance d advantageously provides a lever arm such that when a user moves his or her wrist such that computer mouse 110 twists or pivots about a vertical axis, an approximately linear displacement of sensor location 310 results. Thus, the user can produce mouse input signals indicating lateral movement of the mouse with a small twist of the wrist, without having to move his or her entire arm. Wrist movement can allow more precise control than an arm movement and can also reduce muscle fatigue during long periods of use such as while playing a game.

Further, the offset distance d can be selected to amplify small wrist movements into larger movements of a mouse-controlled cursor across the screen to a desired degree; in general, larger distances d correspond to larger amplifications. In some embodiments, the degree of amplification can also be adjusted via appropriate driver software for processing mouse input signals. Such software typically provides adjustable scaling factors for use in translating motion of the mouse across a given distance to motion of a mouse-controlled screen cursor (or pointer) across some number of screen pixels. Some operating systems provide control interfaces that allow a user to adjust this scaling factor, e.g., by modifying a "pointer speed" setting.

Tracking Sensor and Triggers

Figure 4:
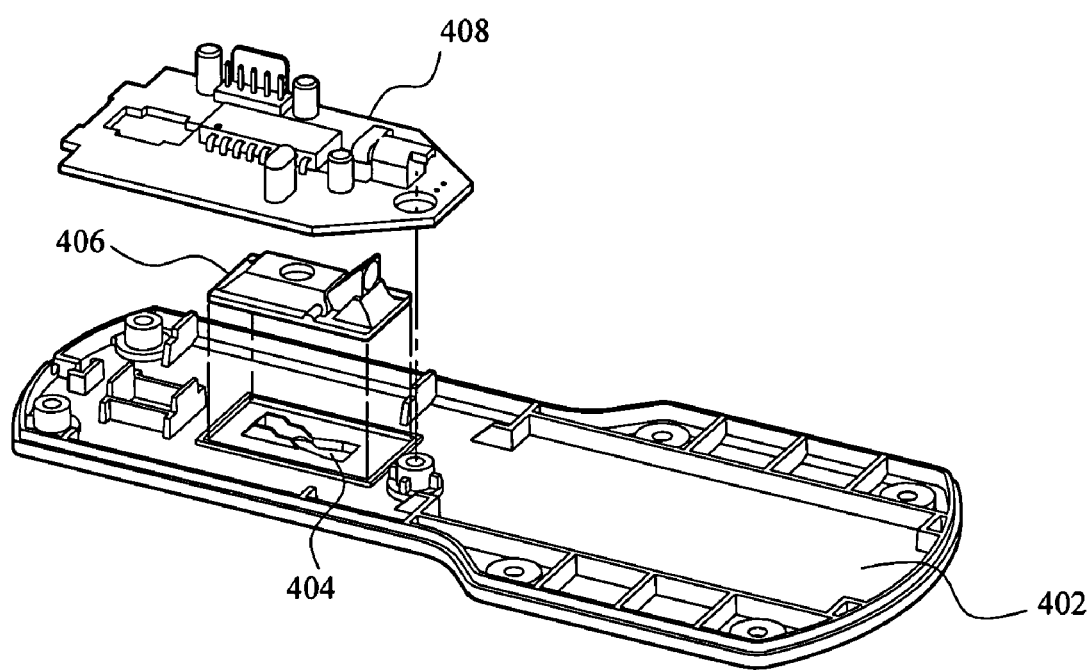
FIG. 4 is an exploded view showing one implementation of a tracking sensor for a computer mouse according to an embodiment of the present invention.

Tracking sensor 308 may be implemented using a variety of sensors, including tracking sensors known in the art. FIG. 4 is an exploded view showing one implementation of a tracking sensor according to an embodiment of the present invention. In this embodiment, a base plate 402, which may be made, e.g., of injection-molded plastic, forms the bottom portion of base member 102. Base plate 402 has an opening 404 therein (corresponding to sensor location 310) through which light may shine. An optical tracking lens system, which may be of conventional design (e.g., an Optical Mouse lens system made by Agilent Systems of Palo Alto Calif.), is aligned with opening 404 and connected to a printed circuit board (PCB) assembly 406 that provides electronics for generating light (e.g., using an LED) and detecting motion. PCB assembly 406 may also be of conventional design (e.g., an Optical Mouse PCB assembly also made by Agilent Systems) and may also include additional components for detecting operation of the triggers and scroll wheel (described below) and for transmitting mouse input signals to a computer system, e.g., via a USB cable or wireless interface.

Figure 5A:
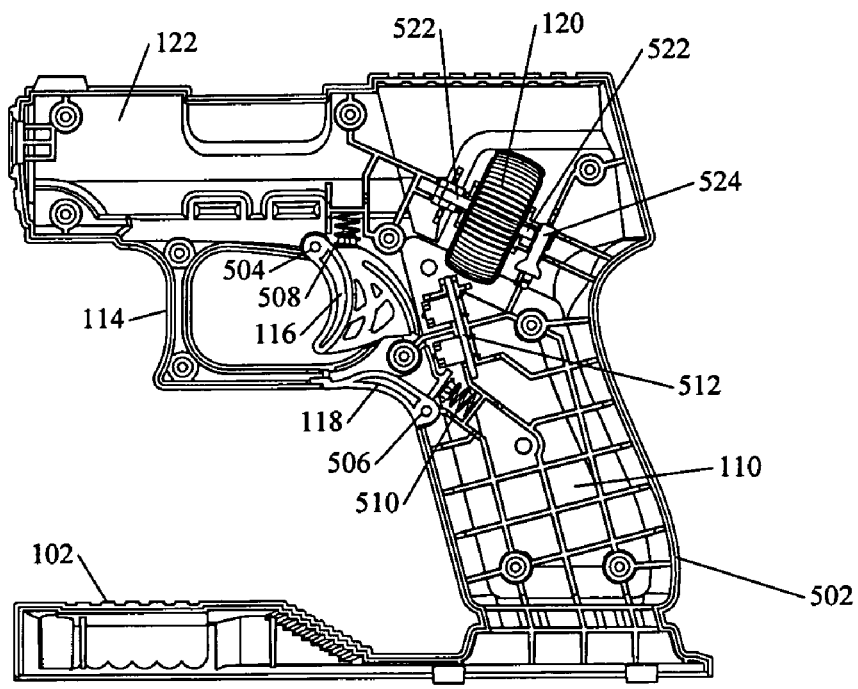
FIGS. 5A-5B are, respectively, a cross sectional view and an exploded view showing control buttons for a computer mouse according to an embodiment of the present invention.
Figure 5B:
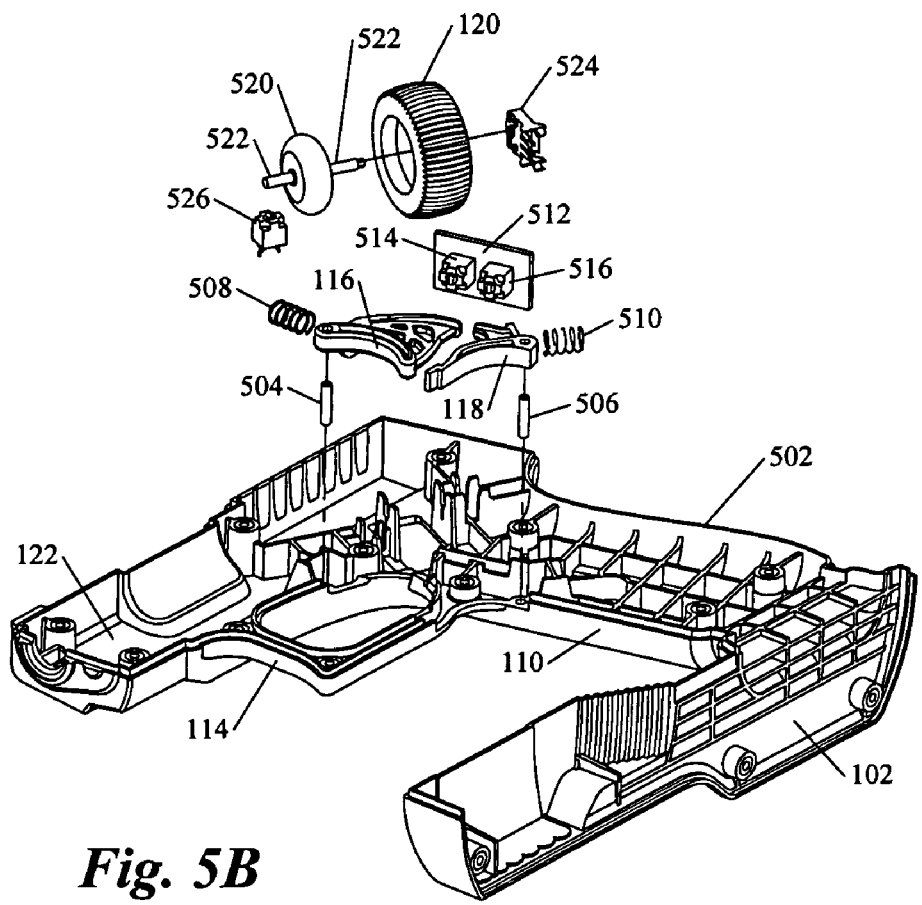

Control buttons (triggers 116, 118) for computer mouse 100 (FIG. 1) will now be described. FIG. 5A is a cross sectional view showing mounting details for triggers 116, 118 in one embodiment of computer mouse 100, and FIG. 5B is an exploded view. In this embodiment, a housing 502 (one side of which is shown) provides the outer shape of base member 102, grip member 110, trigger guard member 114 and barrel member 122.

Triggers 116 and 118 are mounted on respective pivotable supports (e.g., dowel pins) 504 and 506, allowing triggers 116 and 118 to be independently depressed from their resting positions by a user. Springs 508 and 510 are disposed so as to be compressed when triggers 116 and 118, respectively, are depressed and to restore triggers 116 and 118 to their resting positions upon release by the user. An electrical switch assembly 512 that includes switches 514 and 516 is disposed inside housing 502 and behind triggers 116, 118 such that switch 514 is closed when trigger 116 is depressed and switch 516 is closed when trigger 118 is depressed. Switches 514 and 516 are advantageously each implemented as a single throw switch: when a switch 514 or 516 is closed by depressing the corresponding trigger 116 or 118, current flows; when a switch 514 or 516 is open, no current flows. Switch assembly 512 may be electrically connected (e.g., via wires, not explicitly shown in FIGS. 5A-5B) to PCB assembly 408 in base unit 102 (see FIG. 4), and PCB assembly 408 may be configured to detect a "Button1 Down" ("Button2 Down") event when current starts flowing in switch 514 (516) and a "Button1 Up" ("Button2 Up") event when current stops flowing in switch 514 (516), and to signal such events to the computer system.

It will be appreciated that different triggers or buttons, mountings, and signaling elements may be substituted for those shown in FIGS. 5A-5B. For instance, magnetic trigger returns could be used in place of springs 508 and 510. Different electromechanical sensors could replace switches 514 and 516. In some embodiments, single throw switches may be replaced with multiple throw switches that enable additional features (e.g., light and/or sound effects) to be triggered when the user depresses a particular trigger or button.

Scroll Wheel

Scroll wheel 120 is mounted on a rotatable support 520 that includes an axis member 522. At one side of support 520 is a position encoder 524 (which may be of conventional design) that generates signals in response to rotation of support 520. At the other side is a switch 526, and support 520 is advantageously mounted such that switch 526 can be closed by depressing scroll wheel 120 laterally inward. Switch 526 is advantageously also a single-throw switch. A scroll wheel return mechanism (not explicitly shown) may also be provided to restore scroll wheel 120 to its resting position after inward pressure is released. It will be appreciated that different wheel designs, mountings, and signaling elements may be substituted for those shown.

Figure 6:
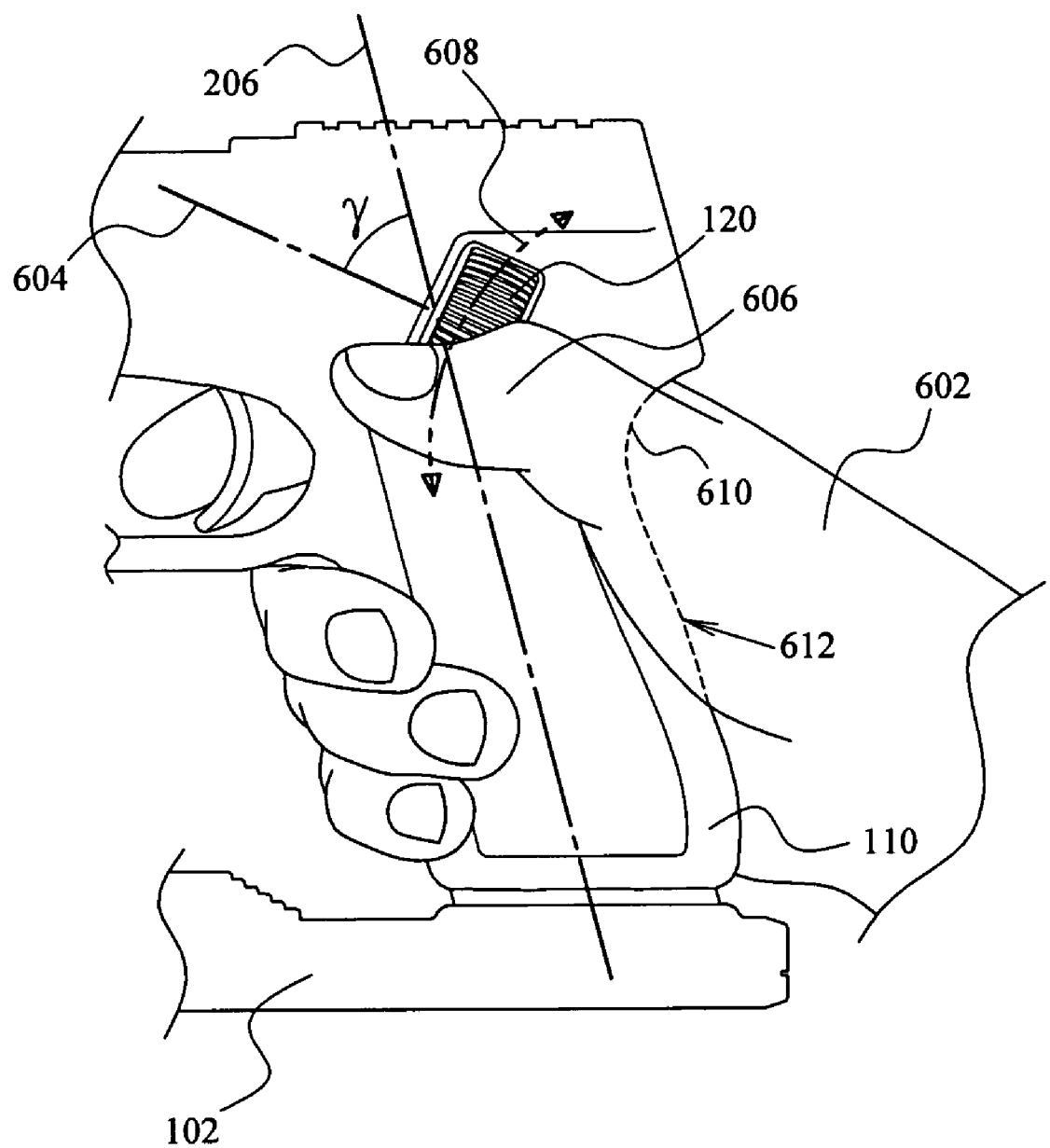
FIG. 6 is a simplified side view showing placement and orientation of a scroll wheel for a computer mouse according to an embodiment of the present invention.

Scroll wheel 120 is advantageously placed and oriented so as to be operable by a user's thumb while the user is holding grip member 110. FIG. 6 is a simplified side view showing placement and orientation of scroll wheel 120 according to an embodiment of the present invention. A user's hand 602 is shown in outline holding grip member 110. Scroll wheel 120 has an axis of rotation 604 that forms an angle γ with major axis 206 of grip member 110. The position of scroll wheel 120 and the angle γ are advantageously selected so that the user's thumb 606 can extend over scroll wheel 120 in approximate alignment with rotational axis 604 while the user holds grip member 110. A natural arc-like motion of thumb 606 (as indicated by double-ended arrow 608) can thus be used to rotate scroll wheel 120. In one embodiment, angle γ is about 30°, but any angle γ in the range from 0° to about 90° may be used. For increased comfort, a notch 610 may be provided in the back surface 612 of grip member 110.

Figure 7:
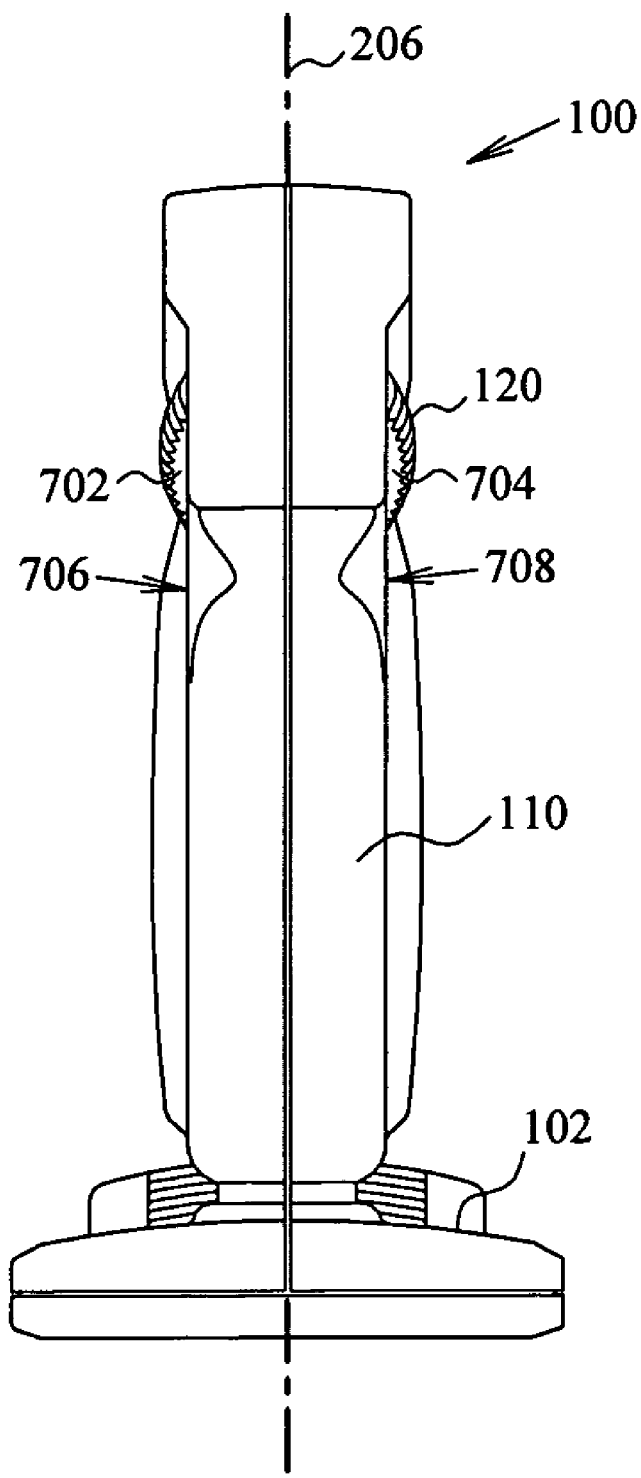
FIG. 7 is a back view of a computer mouse according to an embodiment of the present invention.

It will be appreciated that while the user's hand 602 in FIG. 6 is shown as a right hand, left-handed access to scroll wheel 120 can also be provided. In preferred embodiments, scroll wheel 120 is advantageously positioned to permit access by the thumb of either hand. FIG. 7 is a back view of an embodiment of computer mouse 100 in which scroll wheel 120 can be accessed by the thumb of either hand. In this embodiment, the diameter of scroll wheel 120 is chosen such that scroll wheel 120 has exposed left and right peripheral portions 702 and 704 extending, respectively, through left and right side surfaces 706 and 708 of grip member 110. Left peripheral portion 702 would be accessible by the thumb of a user's right hand while right peripheral portion 704 would be accessible by the thumb of a user's left hand.

In this embodiment, scroll wheel 120 is advantageously depressible from either side. For example, two parallel-coupled switches may be provided, with one switch arranged to be closed by lateral depression of exposed left peripheral portion 702 toward major axis 206 of grip member 110 and the other switch arranged to be closed by lateral depression of exposed right peripheral portion 704 toward major axis 206 of grip member 110. Scroll wheel 120 is advantageously mounted so as to return to its resting position after the pressure from either side is released.

It should be noted that in this embodiment triggers 116, 118 are also operable by either hand as a result of their placement as shown in FIG. 1. Thus, embodiments of the present invention can be "ambidextrous" (i.e., operable with equal ease by either hand) while still providing ergonomic comfort.

It should also be noted that in this embodiment, a user holding grip member 110 in his or her hand can simultaneously cover primary trigger 116 with the index finger, secondary trigger 118 with the second finger, and scroll wheel 120 with the thumb. The ability to simultaneously cover all controls while holding mouse 100 can decrease the user's reaction time and improve game play.

Counterweight

Figure 8:
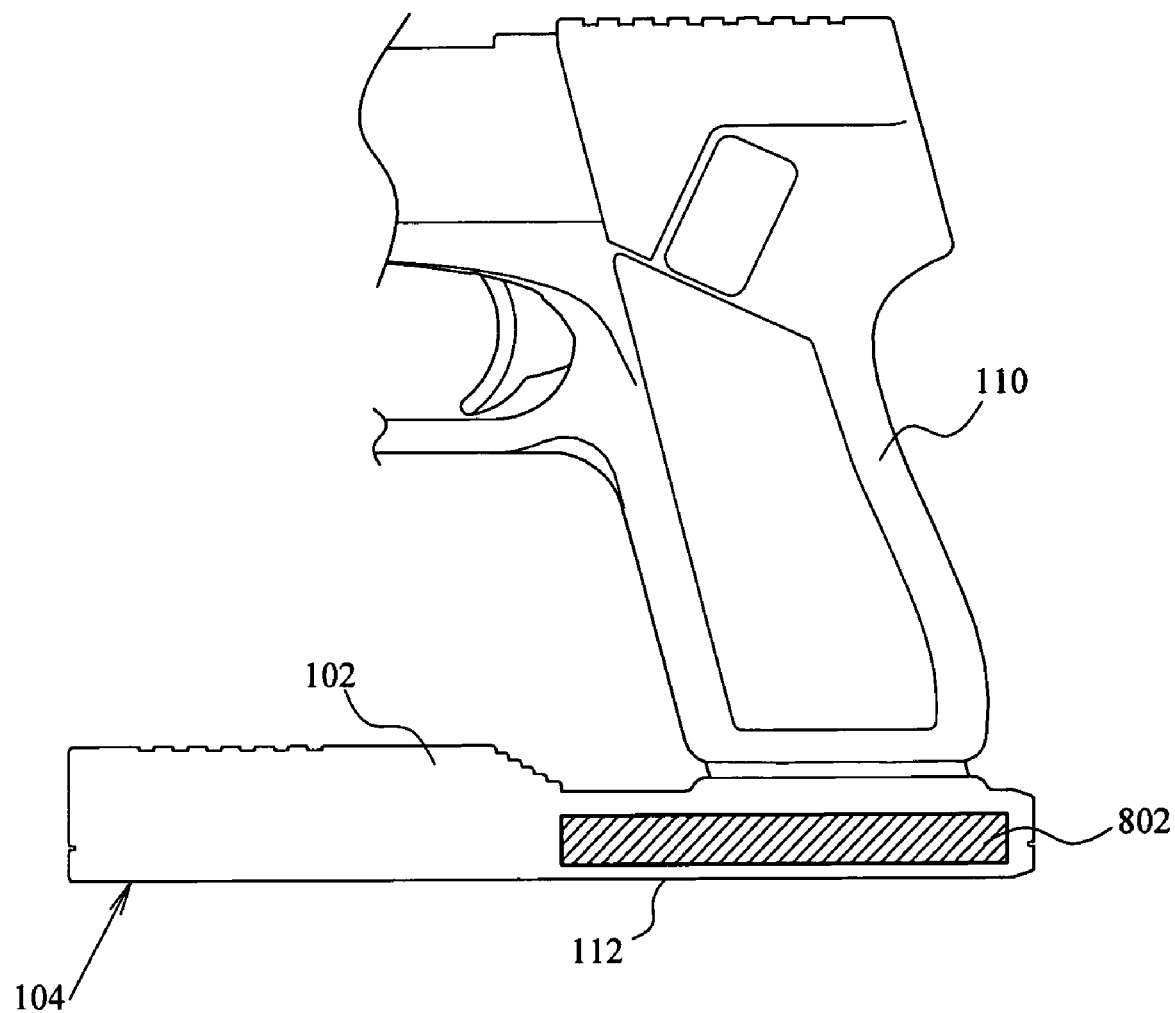
FIG. 8 is a simplified cutaway side view of a computer mouse with a counterweight according to an embodiment of the present invention.

Referring again to FIG. 1, barrel member 122 is provided to enhance the pistol-shaped appearance of computer mouse 100. Barrel member 122 affects the weight distribution and stability of computer mouse 100, adding weight generally near the top and forward of grip member 110. To prevent the weight of barrel member 122 from destabilizing mouse 100, a counterweight may be inserted into base member 102. FIG. 8 is a simplified cutaway side view showing base member 102 having a counterweight 802 disposed therein. Counterweight 802, which is advantageously made of a relatively dense material such as steel bar stock, is disposed toward the rearward section 112 of base member 102, under grip member 110. In this position, counterweight 802 advantageously counterbalances the weight of barrel member 122 and shifts the center of mass of mouse 100 downward toward base 102, providing greater stability and allowing mouse 100 to stand upright even when not in use.

Further Embodiments

While the invention has been described with respect to specific embodiments, one skilled in the art will recognize that numerous modifications are possible. For instance, the particular shapes and design features shown in the drawings may be modified as desired. Moreover, while embodiments described herein are referred to as computer mice and include controls and associated circuitry that provide conventional computer mouse input signals to a computer, it will be appreciated that the invention is not so limited. User input devices with more, fewer, or different controls and signals are also within the scope of the invention, and the arrangement of controls may be varied from that shown and described herein. Dimensions and angles described herein may also be modified or varied as desired.

Electromechanical and electronic signaling elements may also be varied from those shown and described herein. Any type of tracking sensor, including mechanical sensors (e.g., roller sensors of the type used in some conventional computer mice), gyroscopic sensors and so on, may be substituted for the tracking sensors described herein. Any number of control buttons and/or scroll wheels may be arranged in various ways and may activate a variety of mechanical or electromechanical signaling devices to generate input signals for a computer.

Input signals may be transmitted to the computer by a variety of transmission techniques, including cables adapted to various protocols (e.g., USB, PS/2) or a wireless (infrared or RF) transmitter element in the mouse configured to communicate with a compatible receiver element in the computer.

In addition, while reference is made herein to use of a computer mouse or input device for playing games, it is to be understood that embodiments of the present invention are not limited to any particular use. An input device in accordance with the present invention may be used for controlling other computer programs such as word processing programs, World Wide Web browsers, and any other program capable of responding to the input signals generated by the device. Further, a pistol-like shape is not required; for instance, in some embodiments, a barrel member may be omitted.

Thus, although the invention has been described with respect to specific embodiments, it will be appreciated that the invention is intended to cover all modifications and equivalents within the scope of the following claims.

What is claimed is:

1. A device for providing user input to a computer, the device comprising:
    a base member adapted to rest on a support surface, the base member having a substantially flat bottom surface portion adapted for sliding along the support surface;
    a tracking sensor mounted in the base member, the tracking sensor being configured to generate a position input signal in response to a motion of the base member;
    a grip member adapted to be held by a substantially vertically oriented hand of a user, the grip member being fixedly coupled to the base member and extending upward therefrom, the grip member having a major axis extending upward at an angle of at least about 45 degrees relative to the substantially flat bottom surface portion;
    a scroll wheel rotatably mounted in the grip member such that a first peripheral portion of the scroll wheel extends through a first side surface of the grip member, the scroll wheel having a rotational axis that forms an angle of between about 15 degrees and about 75 degrees with the major axis of the grip member,
    wherein an axis of rotation of the scroll wheel is oriented such that the scroll wheel is rotatable by a substantially arc-like movement of a thumb of a hand holding the grip member across the first peripheral portion;
    a first scroll wheel sensor coupled to detect a rotational movement of the scroll wheel and configured to generate a scroll input signal in response to the rotational movement of the scroll wheel; and
    a signaling circuit configured to transmit the position input signal and the scroll input signal to the computer.

2. The device of claim 1, wherein the scroll wheel is further mounted in the grip member such that the first peripheral portion is depressible toward the first side surface of the grip member and wherein the device further comprises:
    a second scroll wheel sensor coupled to detect depression of the first peripheral portion and configured to generate a scroll press input signal in response to the depression of the first peripheral portion.

3. The device of claim 1, wherein a second peripheral portion of the scroll wheel substantially opposite the first peripheral portion extends through a second side surface of the grip member, thereby enabling ambidextrous access to the scroll wheel.

4. The device of claim 1, wherein the signaling circuit includes a cable adapted to be received at a port of the computer.

5. The device of claim 1, wherein the signaling circuit includes a wireless transmitter.

6. The device of claim 1, wherein the base member has a substantially flat bottom surface adapted for sliding along the support surface.

7. The device of claim 1, wherein the tracking sensor includes an optical motion sensor for detecting motion of the base member.

8. The device of claim 1, wherein the tracking sensor includes a mechanical motion sensor for detecting motion of the base member.

9. The device of claim 1, wherein the tracking sensor includes a gyroscopic motion sensor for detecting motion of the base member.

10. A device for providing user input to a computer, the device comprising:
    a base member adapted to rest on a support surface;
    a tracking sensor mounted in the base member, the tracking sensor being configured to generate a position input signal in response to a motion of the base member;
    a grip member adapted to be held by a substantially vertically oriented hand of a user, the grip member being fixedly coupled to the base member and extending upward therefrom;
    a scroll wheel rotatably mounted in the grip member such that a first peripheral portion of the scroll wheel extends through a first side surface of the grip member and a second peripheral portion of the scroll wheel substantially opposite the first peripheral portion extends through a second side surface of the grip member, thereby enabling ambidextrous access to the scroll wheel,
    wherein an axis of rotation of the scroll wheel is oriented such that the scroll wheel is rotatable by a substantially arc-like movement of a thumb of a hand holding the grip member across the first peripheral portion or the second peripheral portion, and
    wherein the scroll wheel is further mounted in the grip member such that either of the first and second peripheral portions is inwardly depressible toward a center vertical plane of the grip member;
    a first scroll wheel sensor coupled to detect a rotational movement of the scroll wheel and configured to generate a scroll input signal in response to the rotational movement of the scroll wheel;
    a second scroll wheel sensor coupled to detect depression of either the first or second peripheral portion and configured to generate a scroll press signal in response to the detected depression; and
    a signaling circuit configured to transmit the position input signal, the scroll input signal, and the scroll press signal to the computer.

11. The device of claim 10, further comprising:
    one or more button controls, each button control being disposed on the grip member so as to be operable by a different finger of a hand holding the grip member; and
    a respective actuation sensor coupled to detect operation of each button control and configured to generate a respective button input signal in response to the operation of the button control.

12. The device of claim 11, wherein the signaling circuit is further configured to transmit the button input signals to a computer.

13. The device of claim 11, wherein a first one of the button controls has a trigger shape and is positioned so as to be operable by a first finger of a hand holding the grip member.

14. The device of claim 13, wherein a second one of the button controls is positioned below the first button control so as to be operable by a second finger of the hand holding the grip member.

15. The device of claim 14, further comprising a trigger guard member extending forward from the grip member between the first button control and the second button control.

16. The device of claim 15, wherein a forward section of the second button control is mounted on a lower surface of the trigger guard member.

* * * * *